United States Patent
Gibson et al.

(10) Patent No.: US 8,096,613 B2
(45) Date of Patent: Jan. 17, 2012

(54) HEAD RETAINING FOAM LINER FOR CAR SEAT

(75) Inventors: William Gibson, Kent, OH (US); Jody M. Malone, Piqua, OH (US)

(73) Assignee: Meeker R&D, Hiram, OH (US)

( * ) Notice: Subject to any disclaimer, the term of this patent is extended or adjusted under 35 U.S.C. 154(b) by 301 days.

(21) Appl. No.: 12/503,638

(22) Filed: Jul. 15, 2009

(65) Prior Publication Data

US 2011/0012406 A1  Jan. 20, 2011

(51) Int. Cl.
*A47C 1/08* (2006.01)
(52) U.S. Cl. .......... 297/250.1; 297/410; 297/396
(58) Field of Classification Search .......... 297/250.1, 297/410, 396
See application file for complete search history.

(56) References Cited

U.S. PATENT DOCUMENTS

| | | | | |
|---|---|---|---|---|
| 4,854,639 | A * | 8/1989 | Burleigh et al. | 297/250.1 |
| 5,505,523 | A * | 4/1996 | Wang | 297/393 |
| 6,033,019 | A * | 3/2000 | Hession-Kunz et al. | 297/250.1 |
| 7,232,185 | B2 * | 6/2007 | Hartenstine et al. | 297/250.1 |
| 7,275,792 | B2 * | 10/2007 | Pos | 297/396 |
| 7,300,113 | B2 | 11/2007 | Baloga et al. | |
| 7,429,079 | B2 | 9/2008 | Baloga et al. | |
| 2001/0043001 | A1 | 11/2001 | Kassai et al. | |
| 2005/0012372 | A1 | 1/2005 | Baloga et al. | |
| 2007/0057545 | A1 * | 3/2007 | Hartenstine et al. | 297/250.1 |
| 2007/0216203 | A1 | 9/2007 | Rajasingham | |
| 2007/0228788 | A1 | 10/2007 | Meeker et al. | |
| 2008/0067843 | A1 | 3/2008 | Baloga et al. | |
| 2008/0169692 | A1 * | 7/2008 | Clement et al. | 297/250.1 |
| 2009/0167065 | A1 * | 7/2009 | Kespohl | 297/183.4 |

FOREIGN PATENT DOCUMENTS

| EP | 0733509 A1 | 9/1996 |
|---|---|---|
| EP | 1167114 A1 | 1/2002 |

OTHER PUBLICATIONS

International Search Report and Written Opinion dated Mar. 2, 2011 for corresponding application PCT/US10/041722.

* cited by examiner

*Primary Examiner* — David Dunn
*Assistant Examiner* — Erika Garrett
(74) *Attorney, Agent, or Firm* — Hahn Loeser & Parks LLP

(57) ABSTRACT

The invention described herein relates to a foam geometry which reduces the tendency of the child's head to slide forward and roll out by contouring the side foam to have its leading edge closer to the center line of the child's seat than some more rearward portion of the side foam thus forming an inward protruding forward lip on the foam. The depth of the protruding lip is the primary determinant of the increase in head retention, but the particular geometry of the lip, foam density or rigidity, and overall depth also contribute. The invention relates to the contour of a horizontal section of a headrest foam liner being closer to the seat centerline at some distance from the seat back than some distance closer to the seat back.

8 Claims, 5 Drawing Sheets

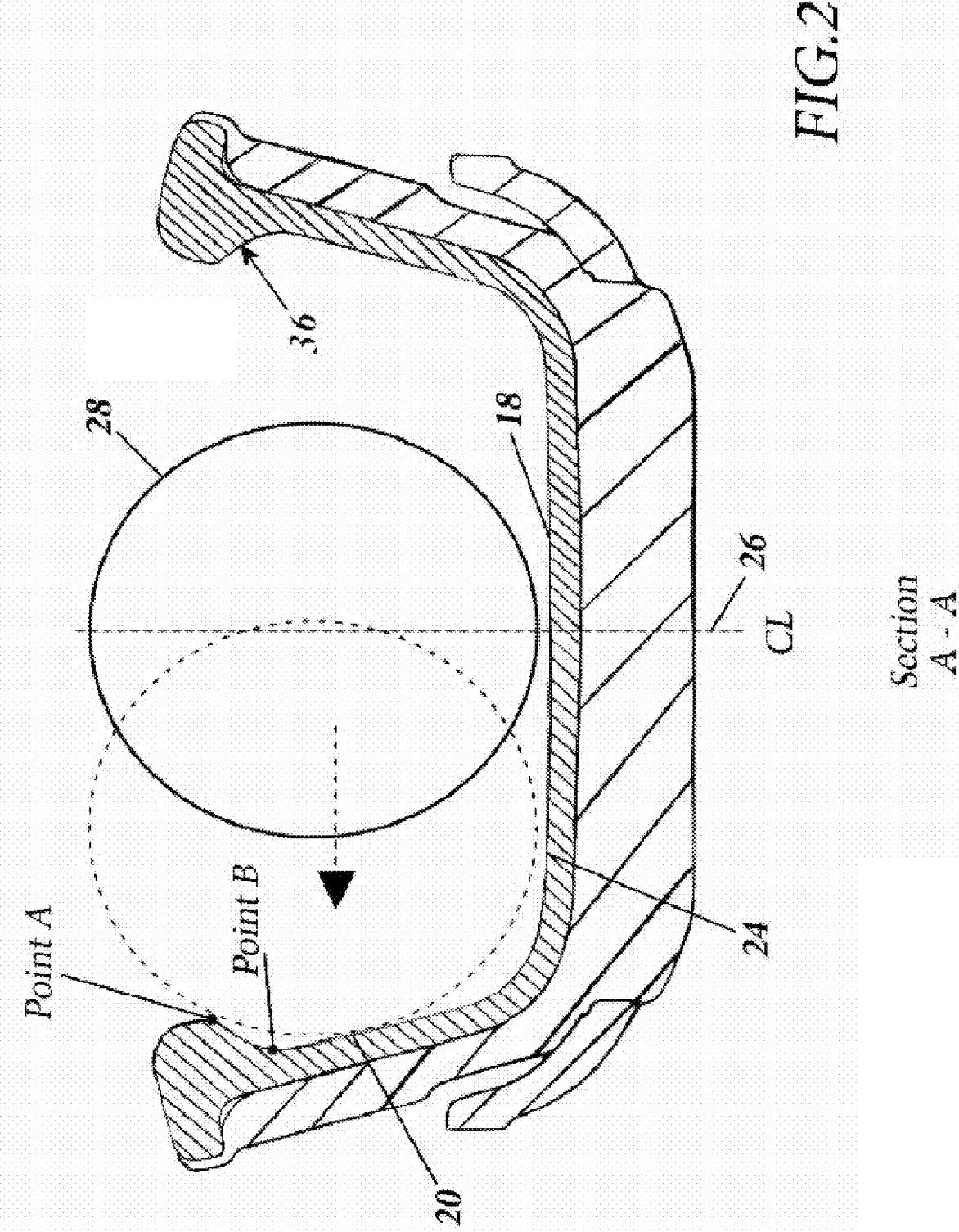

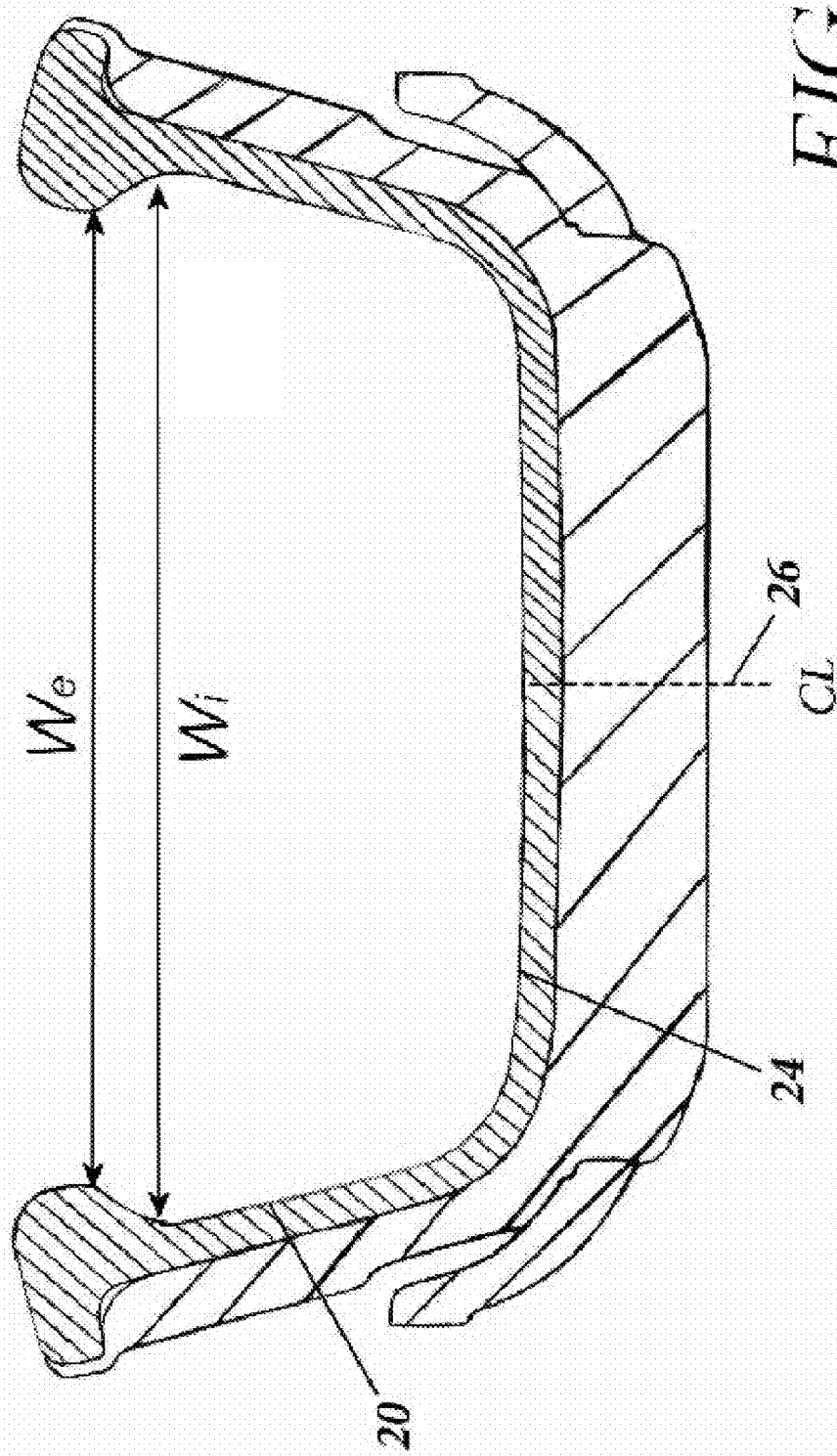

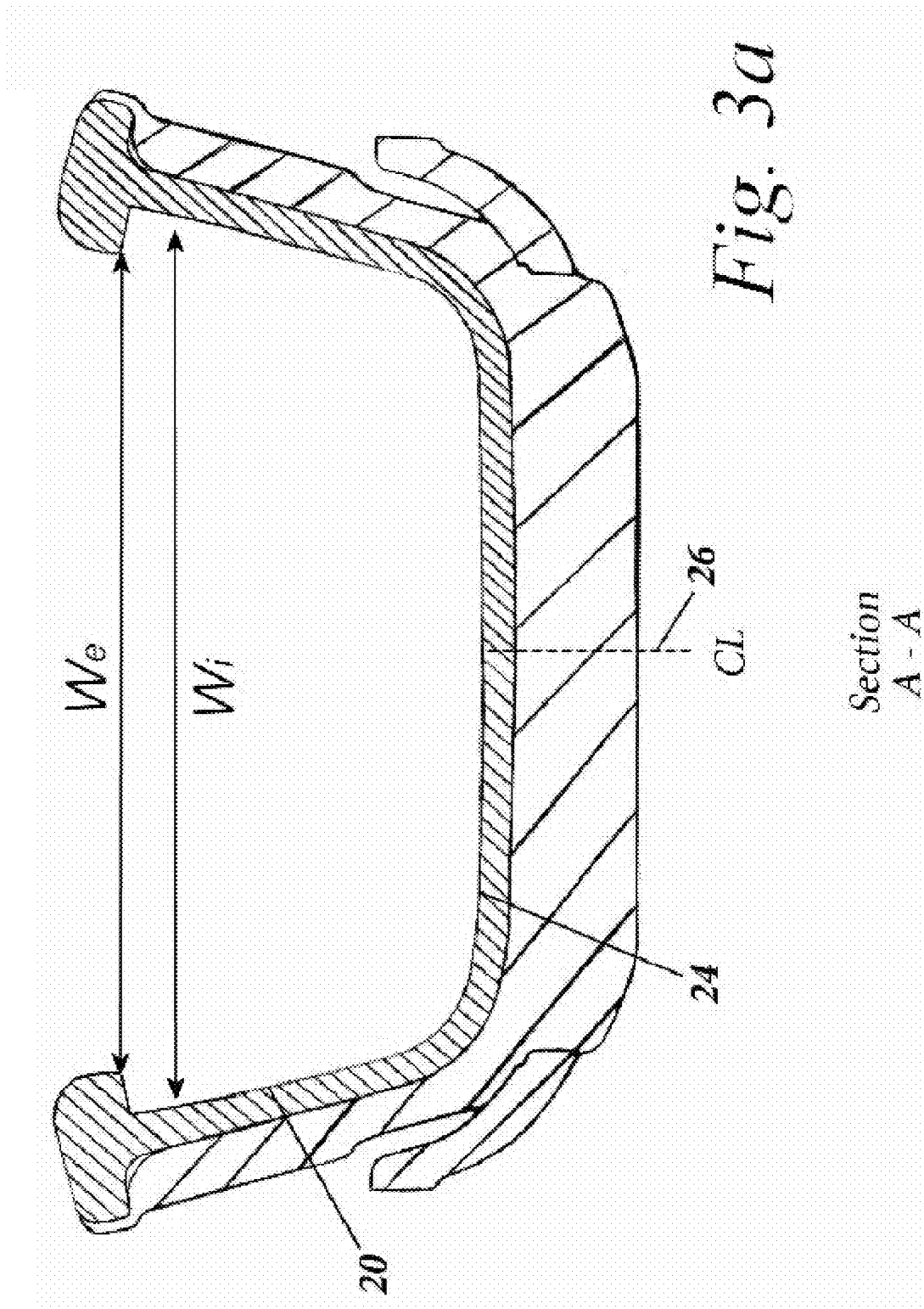

HEAD RETAINING FOAM LINER FOR CAR SEAT

TECHNICAL FIELD

The invention relates generally to foam liners which restrain an occupant's head upon side collision impact.

BACKGROUND OF THE INVENTION

Child restraint systems (children's car seats) are well known. They are supplemental seats for use by children riding in an automobile and are positioned on the automobile seat and aid in protection and comfort of the children passengers. Child restraint systems fall into several categories.

Rear facing seats, i.e., the child faces the rear of the automobile, are designed for children from birth or some specified minimum weight such as 5 pounds through 20 to 30 pounds or more. They are generally a molded plastic shell with a seating area and a back area and raised side walls which are tall enough to include support for a child's head and are often lined with rigid or semi-rigid polystyrene or polypropylene energy absorbing foam in the area where a child's head would normally lie. They also have an internal harness system used to restrain the child and a comfort pad. Infant car seats may be secured in an automobile with the vehicle's seat belt system or Lower Anchors and Tethers for CHildren, acronym "LATCH". Alternatively, the infant car seat may be equipped with a base that is secured with the vehicle's seat belt system and the infant car seat is, in turn, secured to the base.

Toddler car seats are forward facing and intended for children from approximately 20 pounds through 40 to 65 pounds, and sometimes, more. They, like the infant car seats generally have a seating surface, a back surface, and raised sidewalls. Like the infant car seats, these seats are often lined, especially in the head area, with rigid or semi-rigid energy absorbing foam. Toddler car seats also typically have internal harness systems to secure the child and are, in turn, secured to the vehicle seat with the vehicle's seat belt system.

Convertible car seats are combinations of infant car seats and toddler car seats that may be used either rearward facing for younger children or forward facing for older children of the appropriate weight.

Belt positioning booster car seats are used forward facing by children from approximately 30 through 80 to 100 pounds. They also have plastic shells, seating and back areas, and raised sidewalls, and often, energy absorbing foam in the headrest area. Belt positioning booster car seats do not have internal harness systems and instead use the automobile seat belt system to restrain the child.

Belted booster car seats are combinations of toddler car seats and belt positioning booster car seats. They may be used either with the vehicle's seat belt system securing the belted booster car seat and the belted booster car seat's internal harness system securing the child, or with the vehicle's seat belt system securing the child.

Children's car seats are intended to provide a size appropriate seat for a child, more comfort than an automobile seat would provide, and, most importantly, more protection in event of a sudden stop or crash than would be provided by the vehicle's seat alone.

The headrest area of the raised sidewalls of children's car seats, especially when lined with energy absorbing foam, provides some protection for a child in a side impact crash. However, the raised sidewalls are generally angled outward from the back surface to some degree. In a side impact crash, the child's head normally moves sideways and contacts the energy absorbing foam. Due to the outward angle of the sidewall, some component of the sideward movement is translated to a forward movement. Any forward movement increases exposure to the head for contact with outlying vehicle surfaces, flying glass, etc. In addition, any flexibility in the headrest sidewalls will increase the outward angle and encourage even more forward movement of the child's head. In the worst case, the child's head will move forward and roll out of the protective area of the raised sidewalls. The described problem is exacerbated as any crash angle moves from a 90-degree side crash to an oblique crash forward of 90 degrees.

What is missing is a practical means to aid retention of the child's head within the protective area of the car seat's sidewalls that does not add excessive cost, detract from comfort, or add any need for parental interaction.

SUMMARY OF THE INVENTION

In accordance with one aspect of the invention, there is provided a child's car seat with rigid or semi-rigid energy absorbing foam in a defined configuration in the outwardly splayed headrest area of the car seat. Without the unique geometry, this outward splay, along with any structural flexibly, leads to a child's head tending to slide forward along the foam in a side impact crash and possibly even rolling over the edge of the protective foam.

This invention reduces the tendency of the child's head to slide forward and roll out by contouring the side foam to have its leading edge closer to the center line of the child's seat than some more rearward portion of the side foam thus forming an inward protruding forward lip on the foam. The depth of the protruding lip is the primary determinant of the increase in head retention, but the particular geometry of the lip, foam density or rigidity, and overall depth also contribute. The invention relates to the contour of a horizontal section of a headrest foam liner being closer to the seat centerline at some distance from the seat back than at some distance closer to the seat back.

Contouring the side foam to be closer to the seat centerline at some forward distance from the seat back than at some distance closer to the seat back effectively makes the headrest area more retentive of the child's head in a side impact or even an impact with some forward component. Such contouring adds little to cost and thus has a positive impact on cost/benefit. Further, the contouring does not require any consumer interaction such as fastening belts, positioning cushions, etc. Nor does the contouring add any negative aesthetic or other practical impedance to the car seat as it can be completely covered by any comfort pad. Note that a comfort pad can bridge any concave contour created by the lip and will simply push into the concave contour in case of a side impact.

The invention encompasses a headrest for a car seat which includes: a middle area having an outer plastic shell and a foam inner layer, the middle area having a center with an essentially vertical surface; a pair of plastic forward extending wings on opposed sides the middle area, each of said wings having a non-hinged (or one piece constructed out of molded plastic) outer plastic shell, the outer plastic shell having an interior surface and an exterior surface, the outer plastic shell extending at an acute angle from the center plane, and a foam inner layer having an interior surface, optionally conforming to the interior surface of the outer plastic shell; an exterior surface of the foam inner layer having an inwardly protruding lip along at least a portion of an end of the foam inner layer, at least one pair of first points on the inwardly protruding foam lip toward the front of the car seat being dimensionally closer in cross section than at least one other pair of points on the inwardly protruding foam lip closer to the back of the car seat.

The invention also encompasses a headrest for a car seat which includes: a middle area having an outer plastic shell and a foam inner layer, the middle area having a center with an essentially vertical surface; a pair of plastic forward extending wings on opposed sides of the middle area; each of the wings having an outer plastic shell, the outer plastic shell having an interior surface and an exterior surface, the outer plastic shell extending generally at an acute angle from the center plane, and a foam inner layer having an interior surface optionally conforming to the interior surface of the outer plastic shell; an exterior surface of the foam inner layer having an inwardly protruding lip along at least a portion of each end of the foam inner layer, each of the inwardly protruding lips having a peripheral edge, a distance between each peripheral edge defining a headrest width ($W_e$), the headrest having an interior headrest width ($W_i$), defined as a distance between mirror image points which are interior of headrest width ($W_e$), and wherein $W_i > W_e$ along a substantial vertical portion of the foam inner layer at its end in cross-section.

The invention further comprises a headrest for a car seat which includes: a middle area having an outer plastic shell and a foam inner layer, the middle area having a center vertical plane; a pair of plastic forward extending wings on opposed sides the middle area; each of the wings having an outer plastic shell, the outer plastic shell having an interior surface and an exterior surface, the outer plastic shell extending generally at an acute angle from the center plane, and a foam inner layer having an interior surface optionally conforming to the interior surface of the outer plastic shell; an exterior surface of the foam inner layer having an inwardly protruding lip along at least a portion of each end of the foam inner layer, the inwardly protruding lips receding along a radial angle of curvature ($A_c$) having a radial angle of curvature radius (R) and a circumferential radial segment ($R_s$) wherein the radial angle of curvature ranges between approximately 20° to 120° inclusive (more preferably from approximately 20° to 90° inclusive, most preferably from approximately 20° to 45° inclusive; said radial segment ($R_s$) is defined by the formula $$R_s = \frac{A_c * 2 * \pi * R}{360°}$$

wherein R is greater than or equal to twice a width of the foam inner layer measured at approximately a middle of said forward-extending wings.

These and other objects of this invention will be evident when viewed in light of the drawings, detailed description, and appended claims.

BRIEF DESCRIPTION OF THE DRAWINGS

FIG. 2 is a section defined by the cut plane of FIG. 1 also showing a child's head in two positions, a first normal position illustrated in solid lines and a second position after a side impact illustrated in dotted lines;

FIG. 3 is the section of FIG. 2 illustrating the relationship of the exterior ($W_e$) and interior ($W_i$) widths;

FIG. 3a is a section similar to FIG. 3 illustrating a stepped version of the inwardly protruding lips.

DETAILED DESCRIPTION OF THE DRAWINGS

Figure 1:
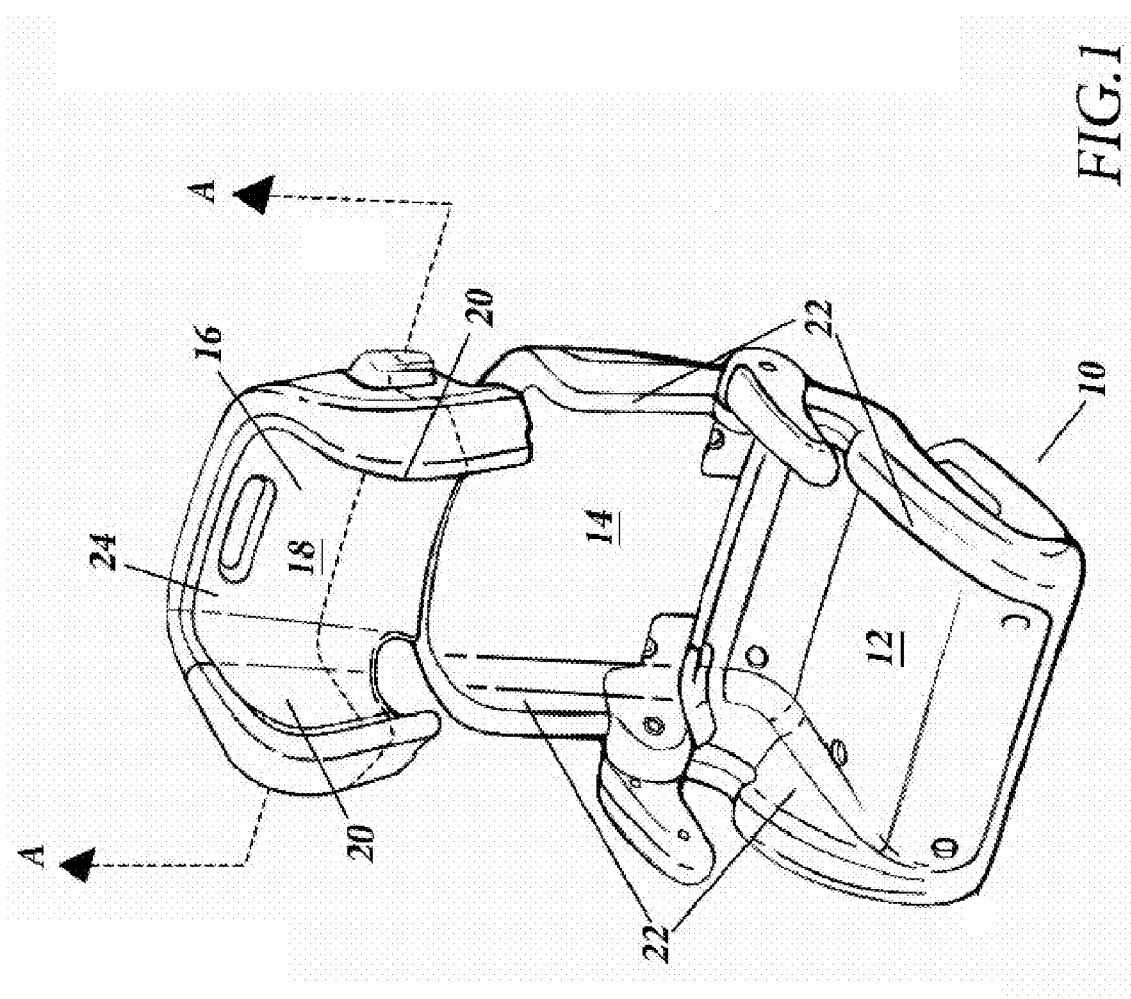
FIG. 1 is a generic child's car seat showing a horizontal cut plane through the headrest.

Referring now to the drawings wherein the showings are for purposes of illustrating the preferred embodiment of the invention only and not for purposes of limiting the same, the Figures show a foam inner liner with inwardly-protruding lips designed to minimize forward motion of an occupant's head upon a side impact collision having at least a portion of its force directed into a forward vector component.

As illustrated in FIG. 1, car seat 10 has a seat 12, a back 14 with included head area 16 with back surface 18 and extended sidewalls 20. Raised curvilinear sidewalls 22 extend upward from seat 12 and back 14 and includes a pair of head area extended sidewalls 20. Head area 16 and included back surface 18 and extended sidewalls 20 include are covered with rigid or semi-rigid foam liner 24. Back surface 18 and extended sidewalls 20 are of rigid or semi-rigid plastic and interconnected without hinges. As shown in FIG. 2, some point A on an extended sidewall 20 is further from back surface 18 than point B on the sidewall and is closer to seat centerline 26 than point B.

As seen in FIG. 2, a child's head 28 which is initially centered about centerline 26, moving in a sideward direction toward one of sidewalls 20, would not slide up the sidewall because of inwardly protruding section 36 of the foam liner at point A.

As better illustrated in FIG. 3, this width distance, namely the smallest lip width ($W_e$) as measured on the peripheral edge of protruding lip, when compared to a largest interior width distance ($W_i$) will serve as a measure of the deterrent force which can be effectively counteracted in a side impact crash with a forward vector component. The arithmetic difference between $W_i$ and $W_e$ defines the margin of safety for the car seat, with larger differences increasing the margin of safety. Alternatively, as illustrated in FIG. 3a, there is no need for the foam liner to move in a curvilinear fashion between $W_i$ and $W_e$ and it is envisioned that a "stepped" embodiment is within the scope of the invention.

Figure 4:
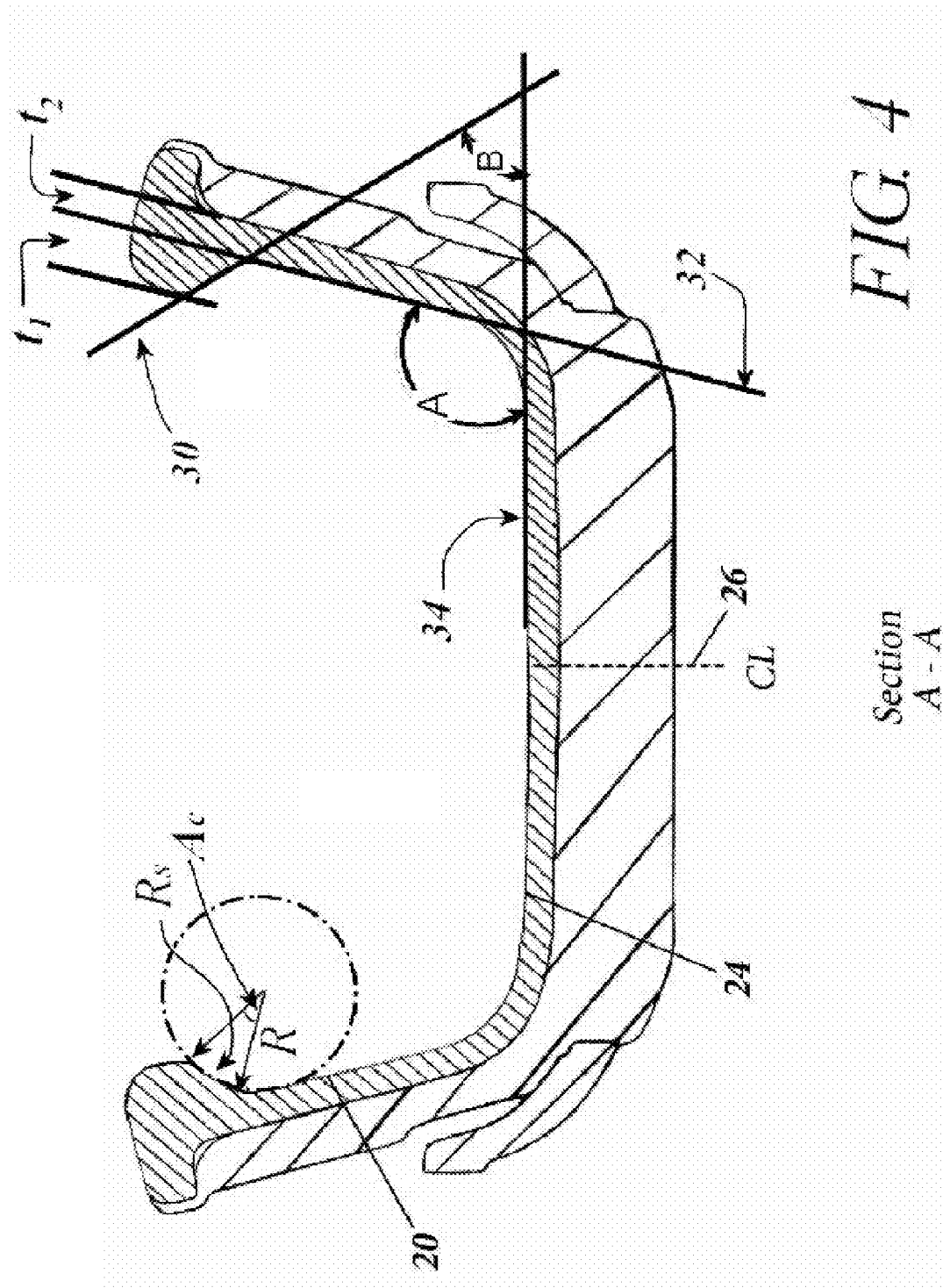
FIG. 4 is the section of FIG. 2 illustrating the geometric relationship between a radial angle of curvature ($A_c$) having a radius (R) and a circumferential radial segment ($R_s$).

As illustrated in FIG. 4, when the path between $W_i$ and $W_e$ is essentially circular in nature (and if elliptical, can be approximated using circular geometry), e.g., inwardly protruding lip is receding along a radial angle of curvature ($A_c$) having a radius (R) and a circumferential radial segment ($R_s$) it has been determined that the radial angle of curvature ranges between approximately 20° to 120° inclusive and that the radial segment ($R_s$) is defined by formula $$R_s = \frac{A_c * 2 * \pi * R}{360°}$$

wherein R is greater than or equal to twice a width of said foam inner layer measured at approximately a middle of said forward-extending wings. In a more preferred embodiment, the radial angle of curvature ranges between approximately 20 and 90° inclusive, and in a most preferred embodiment, the radial angle of curvature ranges between approximately 20 and 45° inclusive.

As further illustrated in FIG. 4, line 34 (drawn tangentially to middle back surface 18, will form an obtuse angle A with line 32 (once again, drawn tangentially with sidewalls 20). Preferably, obtuse angle A will range from between approximately 95° to 150° inclusive, more preferably from approximately 100° to 130° inclusive. Also with reference to FIG. 4, acute angle B, formed by the tangent lines of inwardly protruding section 36 and line 34, will range from between approximately 30° to 80° inclusive, more preferably from approximately 40° to 70° inclusive. Therefore, in general obtuse angle A will be greater than or equal to 90° while acute angle B will be less than or equal to 90° with the proviso that both angles A and B cannot equal 90°. Also illustrated in the Figure is the relationship of the width of the offset $t_1$ as related to the thickness of the foam liner $t_2$. As illustrated, offset thickness $t_1$ is at least as thick, and preferably of greater thickness than of the foam liner $t_2$. Most preferably, $t_1 > t_2$.

By focusing on maintaining existing geometries associated with existing car seats in the head area, coupled with recognition of the need for inwardly protruding lips at least along a substantial vertical length of the end of the foam liner, an enhanced measure of safety is possible for the head of the occupant during a side impact crash with at least a forward vector force component.

The best mode for carrying out the invention has been described for the purposes of illustrating the best mode known to the applicant at the time. The examples are illustrative only and not meant to limit the invention, as measured by the scope and spirit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A headrest for a car seat comprising:
a middle area having an outer plastic shell middle segment, said middle area having a center essentially vertical surface;
a pair of plastic forward extending wings on opposed sides said middle area,
    each of said wings having an outer plastic shell wing segment in non-hinged, molded connection with said outer plastic shell middle segment,
    said outer plastic shell wing segments having an interior surface and an exterior surface,
    said outer plastic shell wing segment extending at an acute angle from said center vertical surface, and
a foam inner layer adjacent to and interior of said middle area of said outer plastic shell middle segment and said pair of forward extending wings, said foam inner layer having an interior surface adjacent an interior of said shell middle segment and said pair of plastic wing segments;
    an exterior surface of said foam inner layer opposed of said inner layer and having an inwardly protruding lip along at least each of a portion of an end of said foam inner layer,
    at least one pair of first points on said inwardly protruding foam lip toward a front of said car seat being dimensionally closer in cross section than at least one other pair of points on said inwardly protruding foam lip closer to a back of said car seat.

2. A headrest for a car seat comprising:
a middle area having an outer plastic shell middle segment, said middle area having a center essentially vertical surface;
a pair of plastic forward extending wings on opposed sides said middle area;
    each of said wings having an outer plastic shell wing segment in non-hinged, molded connection with said outer plastic shell middle segment,
    said outer plastic shell wing segments having an interior surface and an exterior surface,
    said outer plastic shell wing segments extending generally at an acute angle from said center vertical surface, and
a foam inner layer adjacent to and interior of said middle area of said outer plastic shell middle segment and said pair of forward extending wings, said foam inner layer having an interior surface adjacent an interior of said shell middle segment and said pair of plastic wing segments;
    an exterior surface of said foam inner layer opposed of said inner layer and having an inwardly protruding lip along at least a portion of each end of said foam inner layer,
    each of said inwardly protruding lips having a peripheral edge, a distance between each peripheral edge defining a headrest width ($W_e$),
    said headrest having an interior headrest width ($W_i$), defined as a distance between mirror image points which are interior of headrest width ($W_e$), and wherein $W_i > W_e$ along a substantial vertical portion of said foam inner layer at said end in cross-section.

3. A headrest for a car seat comprising:
a middle area having an outer plastic shell middle segment, said middle area having a center essentially vertical surface;
a pair of plastic forward extending wings on opposed sides said middle area;
    each of said wings having an outer plastic shell wing segment in non-hinged, molded connection with said outer plastic shell middle segment,
    said outer plastic shell wing segment having an interior surface and an exterior surface,
    said outer plastic shell wing segment extending generally at an acute angle from said center vertical surface, and
a foam inner layer adjacent to and interior of said middle area of said outer plastic shell middle segment and said pair of forward extending wings, said foam inner layer having an interior surface adjacent an interior of said shell middle segment and said pair of plastic wing segments;
    an exterior surface of said foam inner layer opposed of said inner layer and having an inwardly protruding lip along at least a portion of each end of said foam inner layer,
    said inwardly protruding lip receding along a radial angle of curvature ($A_c$) having a curvature radius (R) and a circumferential radial segment ($R_s$) wherein said radial angle of curvature ranges between approximately 20° to 120° inclusive; said radial segment ($R_s$) is defined by the formula $$R_s = \frac{A_c * 2 * \pi * R}{360°}$$

wherein R is greater than or equal to twice a width of said foam inner layer measured at approximately a middle of said forward-extending wings.

4. The car seat of claim 3 wherein said radial angle of curvature ranges between approximately 20 and 90° inclusive.

5. The car seat of claim 4 wherein said radial angle of curvature ranges between approximately 20 and 45° inclusive.

6. A headrest for a car seat comprising:

a middle area having an outer plastic shell middle segment, said middle area having a center essentially vertical surface;

a pair of plastic forward extending wings on opposed sides said middle area;

each of said wings having an outer plastic shell wing segment in non-hinged, molded connection with said outer plastic shell middle segment, said outer plastic shell wing segment having an interior surface and an exterior surface, said outer plastic shell wing segment extending generally at an obtuse angle A from said center vertical surface, and a foam inner layer adjacent to and interior of said middle area of said outer plastic shell middle segment and said pair of forward extending wings, said foam inner layer having an interior surface adjacent an interior of said shell middle segment and said pair of plastic wing segments;

an exterior surface of said foam inner layer opposed of said inner layer and having an inwardly protruding lip along at least each of a portion of each end of said foam inner layer, said inwardly protruding lip receding along a tangent line;

said tangent line forming an acute angle B with a tangent line along said middle area; and wherein an offset width of said inwardly protruding lip ($t_1$) is greater than or equal to a width of said foam inner layer ($t_2$).

7. The headrest of claim 6 wherein said angle A ranges from approximately 95° to 150° inclusive; and said angle B ranges from approximately 30° to 80° inclusive.

8. The headrest of claim 7 wherein said angle A ranges from approximately 100° to 130° inclusive; and said angle B ranges from approximately 40° to 70° inclusive.

* * * * *